(12) United States Patent
Kogej et al.

(10) Patent No.: US 10,072,943 B2
(45) Date of Patent: Sep. 11, 2018

(54) METHOD OF SCALE SUBSTRATE MANUFACTURE

(75) Inventors: Peter Kogej, Rozna Dolina (SI); Vojteh Leskovsek, Krize (SI)

(73) Assignees: RLS MERILNA TEHNIKA D.O.O., Komenda (SI); RENISHAW PLC, Wotton-under-Edge (GB)

(*) Notice: Subject to any disclaimer, the term of this patent is extended or adjusted under 35 U.S.C. 154(b) by 138 days.

(21) Appl. No.: 14/002,231

(22) PCT Filed: Mar. 5, 2012

(86) PCT No.: PCT/GB2012/000220
§ 371 (c)(1),
(2), (4) Date: Aug. 29, 2013

(87) PCT Pub. No.: WO2012/117230
PCT Pub. Date: Sep. 7, 2012

(65) Prior Publication Data
US 2013/0335071 A1 Dec. 19, 2013

(30) Foreign Application Priority Data
Mar. 3, 2011 (GB) .................................. 1103675.3

(51) Int. Cl.
*G01D 5/12* (2006.01)
*C21D 7/02* (2006.01)
(Continued)

(52) U.S. Cl.
CPC ................. *G01D 5/12* (2013.01); *B23P 13/00* (2013.01); *C21D 7/02* (2013.01); *C21D 7/10* (2013.01);
(Continued)

(58) Field of Classification Search
CPC .. C21D 8/1205; C21D 8/1233; C21D 8/1277; C21D 8/1294; C21D 9/00; C21D 9/0068;
(Continued)

(56) References Cited

U.S. PATENT DOCUMENTS 4,007,073 A * 2/1977 Levin .................... H01F 1/0306
148/120
4,083,220 A * 4/1978 Kobayashi ............... C21D 7/02
148/577

(Continued)

FOREIGN PATENT DOCUMENTS

EP 0 555 563 A2 8/1993
JP A 55-80302 6/1980
(Continued)

OTHER PUBLICATIONS

Lyulicheva et al., Effect of Rolling at Sub Zero Temperatures on Mechanical Properties of Austenitic Steel, Metal Science and Heat Treatment, vol. 1, Issue 4, pp. 23-25.*
(Continued)

*Primary Examiner* — Melissa Koval
*Assistant Examiner* — Courtney McDonnough
(74) *Attorney, Agent, or Firm* — Oliff PLC

(57) ABSTRACT

The present invention relates to a method for producing a magnetic substrate for an encoder scale. The method comprising the step of mechanically working the substrate, wherein the substrate is cooled prior to the mechanical working step. In one embodiment, a stainless steel substrate is used. The stainless steel may comprise an austenite (non-magnetic) phase and a martensite (magnetic) phase. Mechanically working and cooling in this manner increases the amount of magnetic (martensite) phase material that is formed, thereby improving the magnetic contrast when
(Continued)

non-magnetic (austenite) marking are subsequently formed on the substrate by laser marking.

19 Claims, 2 Drawing Sheets

(51) Int. Cl.
*C21D 7/10* (2006.01)
*C21D 8/12* (2006.01)
*C21D 9/00* (2006.01)
*C21D 10/00* (2006.01)
*C23C 8/02* (2006.01)
*H01F 1/16* (2006.01)
*B23P 13/00* (2006.01)
*C23C 8/38* (2006.01)

(52) U.S. Cl.
CPC .............. *C21D 8/12* (2013.01); *C21D 8/1233* (2013.01); *C21D 8/1277* (2013.01); *C21D 8/1294* (2013.01); *C21D 9/00* (2013.01); *C21D 9/0068* (2013.01); *C21D 10/00* (2013.01); *C21D 10/005* (2013.01); *C23C 8/02* (2013.01); *C23C 8/38* (2013.01); *H01F 1/16* (2013.01); *C21D 2201/00* (2013.01); *C21D 2211/001* (2013.01); *C21D 2211/008* (2013.01); *Y10T 29/49* (2015.01)

(58) Field of Classification Search
CPC ............ C21D 10/005; C21D 2211/001; C21D 2211/00; G01D 5/12; B23P 13/00; Y10T 29/49; H01F 1/16; C23C 8/38; C23C 8/02
USPC ......................................... 324/207.13; 29/592
See application file for complete search history.

(56) References Cited

U.S. PATENT DOCUMENTS

| 5,283,130 A | 2/1994 | Bradley et al. | |
| 5,350,463 A | 9/1994 | Tsukamoto et al. | |
| 5,631,093 A * | 5/1997 | Perry | C21D 1/04 148/101 |
| 6,238,490 B1 * | 5/2001 | Bell | C23C 8/38 148/222 |
| 6,406,558 B1 * | 6/2002 | Kurosawa | C21D 8/1233 148/111 |
| 2003/0121567 A1 | 7/2003 | Sugiyama et al. | |
| 2013/0335071 A1 * | 12/2013 | Kogej | C21D 7/02 324/207.13 |

FOREIGN PATENT DOCUMENTS

| JP | A 61-117401 | 6/1986 | |
| JP | A 61-204318 | 9/1986 | |
| JP | A 62-222103 | 9/1987 | |
| JP | A 63-98501 | 4/1988 | |
| JP | A 63-105952 | 5/1988 | |
| JP | S63-161146 A | 7/1988 | |
| JP | A 64-22412 | 1/1989 | |
| JP | 1990288715 A * | 3/1990 | ............... C21D 6/00 |
| JP | A 2-88715 | 3/1990 | |
| JP | A 3-150413 | 6/1991 | |
| JP | A 4-259385 | 9/1992 | |
| JP | A 2012-25993 | 2/2012 | |

OTHER PUBLICATIONS

Tanslation of JP1990288715A (JPH0288715A).*
Translation of "Stainless Steel and the usage of it;" Metallurgical Industry Press; Jan. 2011; pp. 67, 139, and 149-151.
Apr. 28, 2014 Office Action issued in Chinese Patent Application No. 201280012241.7 (with translation).
"Stainless Steel and the usage of it;" Metallurgical Industry Press; Jan. 2011; pp. 67, 139, and 149-151.
Abstract of JP A 61-204318 published Sep. 10, 1986; XP-002677592.
Ara et al; "Formation of Magnetic Grating on Steel plates by Electron/Laser Beam Irradiation;" IEEE Transactions on Magnetics; Sep. 25, 1989; vol. 25; No. 5; pp. 3830-3832.
Abstract of JP A 2012-025993 published Feb. 9, 2012; XP-002677593.
Jun. 14, 2011 Search Report issued in British Application No. GB1103675.3.
Jun. 22, 2012 Search Report issued in International Patent Application No. PCT/GB20112/000220.
Jun. 22, 2012 Written Opinion issued in International Patent Application No. PCT/GB20112/000220.
Feb. 28, 2015 Office Action issued in Chinese Patent Application No. 201280012241.7.
Jan. 22, 2018 Office Action issued in European Patent Application No. 12720541.7.

* cited by examiner

METHOD OF SCALE SUBSTRATE MANUFACTURE

BACKGROUND

The present invention relates to a method of forming a magnetic substrate for an encoder scale.

Magnetic encoders having passive magnetic scales are known. Such encoders include a scale that comprises a series of markings that have a different magnetic permeability than the surrounding material. The magnetic permeability variations of the scale can be sensed using an associated readhead comprising a magnet and a plurality of magnetic field sensors (e.g. Hall sensors).

It has been described previously in JP63098501 how encoder scale marking can be formed in magnetic material by using a laser beam to heat small regions of material. These heated regions are converted from a magnetic material to a non-magnetic material.

SUMMARY

An object of the present invention is to provide an improved method of producing a magnetic substrate for an encoder scale. Such a magnetic substrate produced by the present invention may, for example, subsequently have scale markings applied thereto using a laser marking process.

According to a first aspect of the present invention, there is provided a method for producing a magnetic substrate for an encoder scale, the method comprising the step of mechanically working the substrate, wherein the substrate is cooled prior to the mechanical working step. Advantageously, the substrate is cooled after the mechanical working step. The substrate may also be cooled during the mechanical working step.

The combination of mechanical working (also termed cold forming) and cooling of the substrate has been found to increase the amount of magnetic material formed during substrate processing. This improves the magnetic permeability difference between subsequently formed scale markings and the substrate thereby providing improved magnetic encoder performance.

Conveniently, the substrate comprises a metal. The substrate may comprise steel. Preferably, the substrate comprises stainless steel. Advantageously, the stainless steel is an austenite grade of stainless steel; e.g. AISI 304L grade stainless steel may be used. The substrate preferably comprises a non-amorphous (e.g. crystalline) material. The substrate is thus preferably formed from a material that can adopt a non-magnetic phase and a magnetic phase. This may, for example, comprise a material that can adopt an austenite (non-magnetic) and martensite (magnetic) phase.

Advantageously, the mechanical working step is performed on a substrate that has been cooled to a temperature below room temperature. Preferably, the mechanical working step is performed on a substrate that has been cooled below 0° Celcius. In a preferred embodiment, the mechanical working step is performed on a cryogenically cooled substrate. Such cryogenic cooling may be provided by immersion of the substrate in a bath of liquid nitrogen.

The substrate may be formed in any suitable shape. Preferably, the substrate is elongate. Advantageously, the substrate comprises a rod. Conveniently, the substrate may take the form of a tape.

Any suitable mechanical working step may be performed on the substrate. For example, pressing, hammering, beating etc. Advantageously, the mechanical working step comprises drawing the substrate. Preferably, the mechanical working step comprises the step of rolling the substrate. Conveniently, the mechanical working step comprises the step of performing a plurality of working operation on the substrate. The substrate may comprise an elongate substrate, such as a rod or tape, and a thickness of the elongate substrate may be reduced by each working operation. For example, the rod diameter or the tape thickness may be reduced by each working (e.g. each drawing or rolling) operation. Preferably, the desired final thickness of the elongate substrate is obtained in a plurality of steps.

Conveniently, a thickness of the elongate substrate is reduced by no more than 20% during each working operation. Preferably, a thickness of the elongate substrate is reduced by approximately 5 to 10% during each working operation.

The method may comprise a step of heating the substrate after completion of the mechanical working step. The heating step may comprise heating the substrate to an elevated temperature for a prolonged period. For example, the substrate may be heated above 100° C., above 200° C. or above 300° C. Advantageously, the substrate may be heated to around 450° C. The elevated temperature may be maintained for at least an hour or at least two hours. Preferably, the elevated temperature is below any phase transition temperature above which the material reverts to a non-magnetic (e.g. austenitic) state.

The method may comprise the additional step of applying a surface hardening step after the step of mechanically working the substrate. For example, the surface hardening step may conveniently comprise pulsed plasma nitriding.

A step may also be performed of using a laser to locally heat the substrate to form non-magnetic markings therein that define an encoder scale. This may be done before the surface hardening step.

The present invention also extends to a magnetic substrate for an encoder scale produced using the method described above. Preferably, the encode scale is a passive magnetic scale. It should be noted that a "passive" magnetic scale is not magnetised in any way (i.e. it does not generate a magnetic field) but has local magnetic permeability variations that affect the magnetic field generated by the magnet of an associated magnetic scale reader unit. This should be contrasted to "active" magnetic scales in which north and south magnetic poles are formed.

BRIEF DESCRIPTION OF THE DRAWINGS

The invention will now be described, by way of example only, with reference to the accompanying drawings, wherein.

DETAILED DESCRIPTION OF EMBODIMENTS

Figure 1:
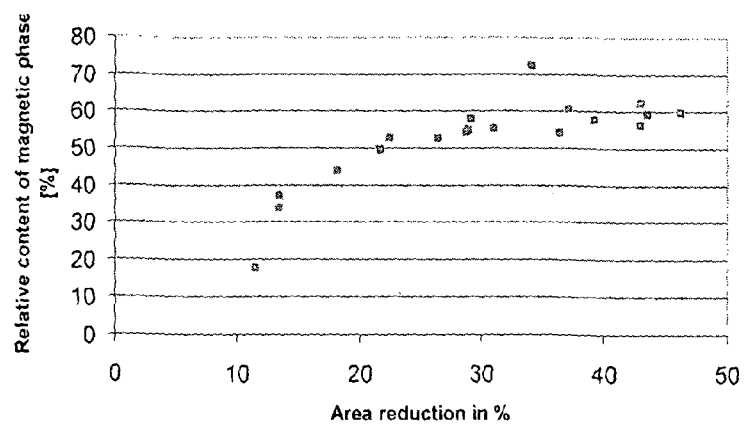
FIG. 1 shows the relative content of magnetic phase material as a function of the area reduction provided by the drawing process.

In a preferred embodiment of the method that will now be described in detail, the present invention allows a high content of martensite phase to be formed in an austenite grade of stainless steel. The resulting stainless steel substrate (which may be provided in the form of a tape or rod) can then be made into an encoder scale by creating small non-magnetic regions using a suitable marking process (e.g. laser marking).

Martensite is formed in austenitic stainless steel during cooling below room temperature (thermally) or by mechanical working (also called "cold forming" because the material is not heated during working). The present inventors have found that the amount of martensite formed in a rod or tape can be increased by using both cooling and mechanical working.

The temperature at which martensite starts forming when cooled depends on the carbon (C) and nitrogen (N) content of the steel. The lower the C and N content, the higher the temperature associated with martensite forming. The stainless steel material AISI 304L was found to be a suitable material.

The magnetic content of the steel was detected using Feritscope MP-30. It should be noted that the results (percentage of ferrite grade) of the magnetic content measurements presented herein are not actual (absolute) values of magnetic content. Such measurements are thus provided purely for comparative purposes.

A first experiment was performed by cooling 2 mm thick (flat) tapes of AISI 304L stainless steel down to between −30 and −70° C. before reducing their thickness. This cooling was done by immersing the tapes in a bath of liquid nitrogen prior to drawing the tapes through drawing dies.

The best magnetic contents achieved were around 25% if cooling was done only prior to deformation. It was, however, found that if the tapes were cooled before deformation and also cooled again just after the deformation, the magnetic contents increased to around 40%.

Further increases in the magnetic content of the tapes were obtained by performing the deformation step in multiple stages. Immersing the tape in liquid nitrogen before and after deformation provided magnetic contents in range of 55% to 60% if the deformation occurred in several stages. It is thought that if the deformation is high (e.g. the reduction of thickness is 30-40% in one pass) the temperature of the tape increases during the deformation thereby slowing the formation of martensite. The best results were achieved when the tape's thickness was reduced by 5 to 10% at each pass through the cylinders.

The process was repeated with stainless steel (AISI 304L grade) rods by drawing the rods step by step through the drawing dies. The rods were cooled to −196° C. before drawing and immersed again in liquid nitrogen just after passing the dies. The magnetic contents achieved were again in range from 55 to 60%.

The accompanying FIG. 1 shows the relative content of magnetic phase material of the rod as a function of the percentage area reduction. It seems that approximately 55% of magnetic phase is obtained if the rod's area is reduced by 25 to 35%. An additional increase of magnetic content of approximately 10% was observed if the rod was heated up to 450° C. in vacuum for several hours after the cooling/forming process.

Following rod (or tape) formation, a surface hardening process may be performed. This can improve mechanical robustness of the scale and may be done after any required scale markings are formed in the rod. This surface hardening process may comprise, for example, a plasma nitriding process of the type described below.

A rod made using the method outlined above was taken that has a relative content of magnetic phase of 62%. This rod was nitrided at 400° C. for 10 hours in a 25% $N_2$ and 75% $H_2$ atmosphere. The rod had locally heat treated regions of approximately semicircular shape (i.e. scale markings); these were about 0.13 mm deep and 0.28 mm wide (on the surface). These regions are non-magnetic (austenite) markings formed in the surface of the rod using a laser treatment process.

Following the nitriding process, the hardness of the rod's core increased from 460 $HV_{10}$ to 580 $HV_{10}$ (620 $HV_{0.01}$). The surface hardness of the rod itself is 1318 $HV_{0.01}$ after nitriding, while surface hardness of the rod on the top of the heat treated regions is 470 $HV_{0.01}$. Hardness within the heat treated area (i.e. within austenite region) is 295 $HV_{0.01}$. The depth of the nitrided layer was found to be approximately 8 µm in martensite and 3.5-4 µm in austenite regions.

Figure 2:
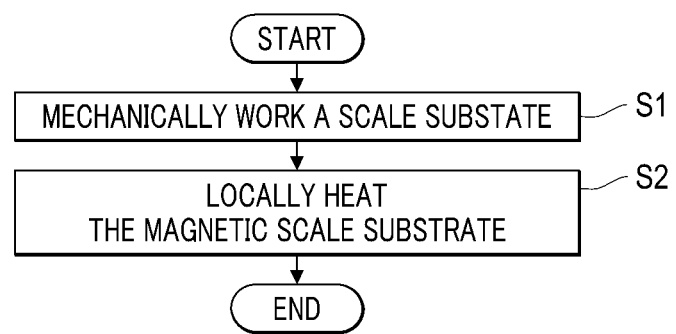
FIG. 2 shows a method for producing a passive encoder scale.

FIG. 2 illustrates an exemplary method for producing a passive encoder scale. Step S1 includes the step of mechanically working a scale substrate to form a magnetic scale substrate, wherein the scale substrate is cooled prior to the mechanical working step, wherein the mechanical working step is performed on a substrate that has been cooled to a temperature below room temperature. Step S2 includes the step of using a laser to locally heat the magnetic scale substrate to form non-magnetic markings therein that define the passive encoder scale in which the non-magnetic markings have a different magnetic permeability than the magnetic scale substrate.

A small increase (in percents, not in tens of percents) of signal amplitude was observed in the nitrided sample. This effect is thought to occur due to a small amount of ε martensite (i.e. martensite that is paramagnetic) being transformed into ferromagnetic (α') martensite because of the treatment at temperatures of approximately 400 to 450° C. for several hours.

It is important to note that the above is merely one example of the present invention. The method may be applied to different materials and the substrates may be used for purposes other than making encoder scale. The various temperature and processing parameters outlined above are also merely illustrative and the skilled person would readily appreciate how the process could be adapted to other materials.

The invention claimed is:

1. A method for producing a passive encoder scale, the method comprising the steps of:
   (a) mechanically working a scale substrate to form a magnetic scale substrate, wherein the scale substrate is cooled prior to the mechanical working step, wherein the mechanical working step is performed on a substrate that has been cooled to a temperature below room temperature, and
   (b) using a laser to locally heat the magnetic scale substrate to form non-magnetic markings therein that define the passive encoder scale in which the non-magnetic markings have a different magnetic permeability than the magnetic scale substrate, wherein the passive encoder scale does not generate a magnetic field.

2. A method according to claim 1, wherein the substrate is cooled after the mechanical working step.

3. A method according to claim 1, wherein the substrate is cooled during the mechanical working step.

4. A method according to claim 1, wherein the substrate comprises a metal.

5. A method according to claim 4, wherein the substrate comprises stainless steel.

6. A method according to claim 5, wherein the stainless steel is an austenite grade of stainless steel.

7. A method according to claim 1, wherein the mechanical working step is performed on a substrate that has been cooled below 0° Celcius.

8. A method according to claim 1, wherein the mechanical working step is performed on a cryogenically cooled substrate.

9. A method according to claim 1, wherein the substrate comprises an elongate rod or tape.

10. A method according to claim 1, wherein the mechanical working step comprises drawing the substrate.

11. A method according to claim 1, wherein the mechanical working step comprises rolling the substrate.

12. A method according to claim 1, wherein the mechanical working step comprises the step of performing a plurality of working operations on the substrate, wherein the substrate comprises an elongate substrate, such as a rod or tape, and a thickness of the elongate substrate is reduced by each working operation.

13. A method according to claim 12, wherein a thickness of the elongate substrate is reduced by no more than 20% during each working operation.

14. A method according to claim 13, wherein a thickness of the elongate substrate is reduced by approximately 5 to 10% during each working operation.

15. A method according to claim 1, wherein the substrate is heated to an elevated temperature for at least one hour after the step of mechanically working the substrate.

16. A method according to claim 1, comprising the additional step of applying a surface hardening step after the step of mechanically working the substrate.

17. A method according to claim 16, wherein the surface hardening step comprises pulsed plasma nitriding.

18. A passive encoder scale produced using the method according to claim 1.

19. A method according to claim 1, wherein the substrate is formed from AISI 304L stainless steel.

* * * * *